US007719527B2

(12) United States Patent
Lu

(10) Patent No.: US 7,719,527 B2
(45) Date of Patent: May 18, 2010

(54) LED CONTROL CIRCUIT FOR AUTOMATICALLY GENERATING LATCH SIGNAL

(75) Inventor: Guan-Ting Lu, Hsinchu (TW)

(73) Assignee: Silicon Touch Technology Inc., Hsin-Chu (TW)

( * ) Notice: Subject to any disclaimer, the term of this patent is extended or adjusted under 35 U.S.C. 154(b) by 763 days.

(21) Appl. No.: 11/675,096

(22) Filed: Feb. 15, 2007

(65) Prior Publication Data

US 2008/0007320 A1 Jan. 10, 2008

(30) Foreign Application Priority Data

Jul. 10, 2006 (TW) .............................. 95212088 U

(51) Int. Cl.
*G06F 3/038* (2006.01)
*G09G 3/32* (2006.01)

(52) U.S. Cl. ........................................ 345/204; 345/82

(58) Field of Classification Search ................. 345/204, 345/212, 213, 98–100, 76–83, 36, 39, 44–46; 315/169.3; 313/463, 504; 348/800–803; 347/237, 238, 247, 250
See application file for complete search history.

(56) References Cited

U.S. PATENT DOCUMENTS

| | | | | |
|---|---|---|---|---|
| 7,126,623 | B2 * | 10/2006 | Yen | 347/237 |
| 2006/0125425 | A1 | 6/2006 | Yen | |
| 2007/0211010 | A1 * | 9/2007 | Lin | 345/99 |

FOREIGN PATENT DOCUMENTS

| | | |
|---|---|---|
| TW | M257073 | 2/2005 |

* cited by examiner

*Primary Examiner*—Jimmy H Nguyen
(74) *Attorney, Agent, or Firm*—Winston Hsu

(57) ABSTRACT

A control circuit for controlling an LED device according to an input data signal and a clock signal is disclosed. The control circuit includes at least one first control module. The first control module includes a shift register unit, a latch register unit, an LED driving circuit, and a latch signal generator. The shift register unit includes at least one shift register and is triggered by the clock signal for buffering data transmitted in the input data signal. The latch register unit includes at least one latch register and is triggered by a latch signal for latching data buffered by the shift register. The LED driving circuit is utilized for driving the LED device according to data latched by the latch register. The latch signal generator is used to generate the latch signal according to the input data signal and the clock signal.

10 Claims, 4 Drawing Sheets

LED CONTROL CIRCUIT FOR AUTOMATICALLY GENERATING LATCH SIGNAL

BACKGROUND OF THE INVENTION

1. Field of the Invention

The present invention is to provide a control circuit for controlling a Light Emitting Diode (LED) device according to an input data signal and a clock signal.

2. Description of the Prior Art

At present, there exist three conventional schemes for controlling an LED device, including a parallel control scheme, an address control scheme, and a series control scheme respectively. The parallel control scheme utilizes electronic lines to connect all independent lamp apparatuses and a system controller respectively. The advantage of the parallel control scheme is that control is very simple. The disadvantage, however, is that the parallel control scheme costs a lot of electronic lines and results in a problem for settling lamp apparatuses. The problem is that distances between the lamp apparatuses and the system controller are different since not all lamp apparatuses are distributed over the same area. The address control scheme gives all lamp apparatuses different addresses such that the system controller can control a specific lamp apparatus by using an address corresponding to the specific lamp apparatus; however, transmitting controlling signals and address signals for the address control scheme to control lamp apparatuses is necessary. This causes problems when producing, settling, and maintaining lamp apparatuses. The series control scheme adds a control circuit on each lamp apparatus and uses electronic lines to connect one lamp apparatus to another for controlling all lamp apparatuses. The advantage of the series control scheme is that cost of electronic lines is reduced and lamp apparatuses can be controlled with the same system. When applied to early LED devices, however, the series control scheme requires six electronic lines for control. Please refer to FIG. 1. FIG. 1 is a diagram of a prior art LED system 100. As shown in FIG. 1, the LED system 100 comprises a plurality of LED devices 102, 104, 106. It is necessary for the LED devices 102, 104, 106 to connect themselves to the power supply voltage level $V_{cc}$, ground voltage level $V_{ss}$, data signal DAT, clock signal CLK, latch signal LAT, and the enable signal EN. In order to prevent signals from degrading caused by the series connection structure, extra buffer amplifiers are added in the LED system 100 to prevent the data signal DAT, clock signal CLK, latch signal LAT, and enable signal EN respectively from degrading. Recently, the Pulse Width Modulation (PWM) technology has been applied to controlling LED devices. One of the advantages of the PWM technology is to reduce a large amount of driving data. More and more system designers incline to (prefer to) utilize the PWM technology for generating the latch signal automatically instead of using the manual latch signal and the enable signal simultaneously. Please refer to FIG. 2. FIG. 2 is a diagram of another prior art LED system 200 using the PWM technology. As shown in FIG. 2, only four electronic lines, including the power supply voltage level $V_{cc}$, ground voltage level $V_{ss}$, data signal DAT, and the clock signal CLK, are needed for controlling the LED devices 202, 204, 206 within the LED system 200. The purpose of the PWM technology is to reduce the above-mentioned large amount data for transmission. Generating the latch signal automatically can be achieved by utilizing a clock loss detection circuit to detect the clock signal for checking if the clock signal is not received in a detection period. If the clock signal is not received in the detection period, the latch signal will be generated to control the LED devices. The detection period cannot be changed, however, since the detection period has to be set in advance for the clock loss detection circuit to detect the clock signal. The system will waste a lot of time for waiting if the detection period is too long. Oppositely, if the detection period is too short, the minimum input frequency of the clock signal will be limited. The latch signal will be generated easily by unexpected events, and therefore the LED devices are erroneously enabled. It is hard for the system to control the LED devices precisely.

SUMMARY OF THE INVENTION

Therefore one of the objectives of the claimed invention is to provide a control circuit for utilizing an input data signal and a clock signal to generate a latch signal automatically to control an LED device, to solve the above-mentioned problem.

According to the claimed invention, a control circuit for controlling an LED device according to an input data signal and a clock signal is disclosed. The control circuit comprises at least one first control module. The first control module includes a shift register unit, a latch register unit, an LED driving circuit, and a latch signal generator. The shift register unit, coupled to the input data signal and the clock signal, comprises at least one shift register and is triggered by the clock signal for buffering data transmitted in the input data signal. The latch register unit, coupled to the shift register unit, comprises at least one latch register and is triggered by a latch signal for latching data buffered by the shift register. The LED driving circuit, coupled to the latch register unit, is utilized for driving the LED device according to data latched by the latch register. The latch signal generator, coupled to the input data signal and the clock signal, is used to generate the latch signal according to the input data signal and the clock signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
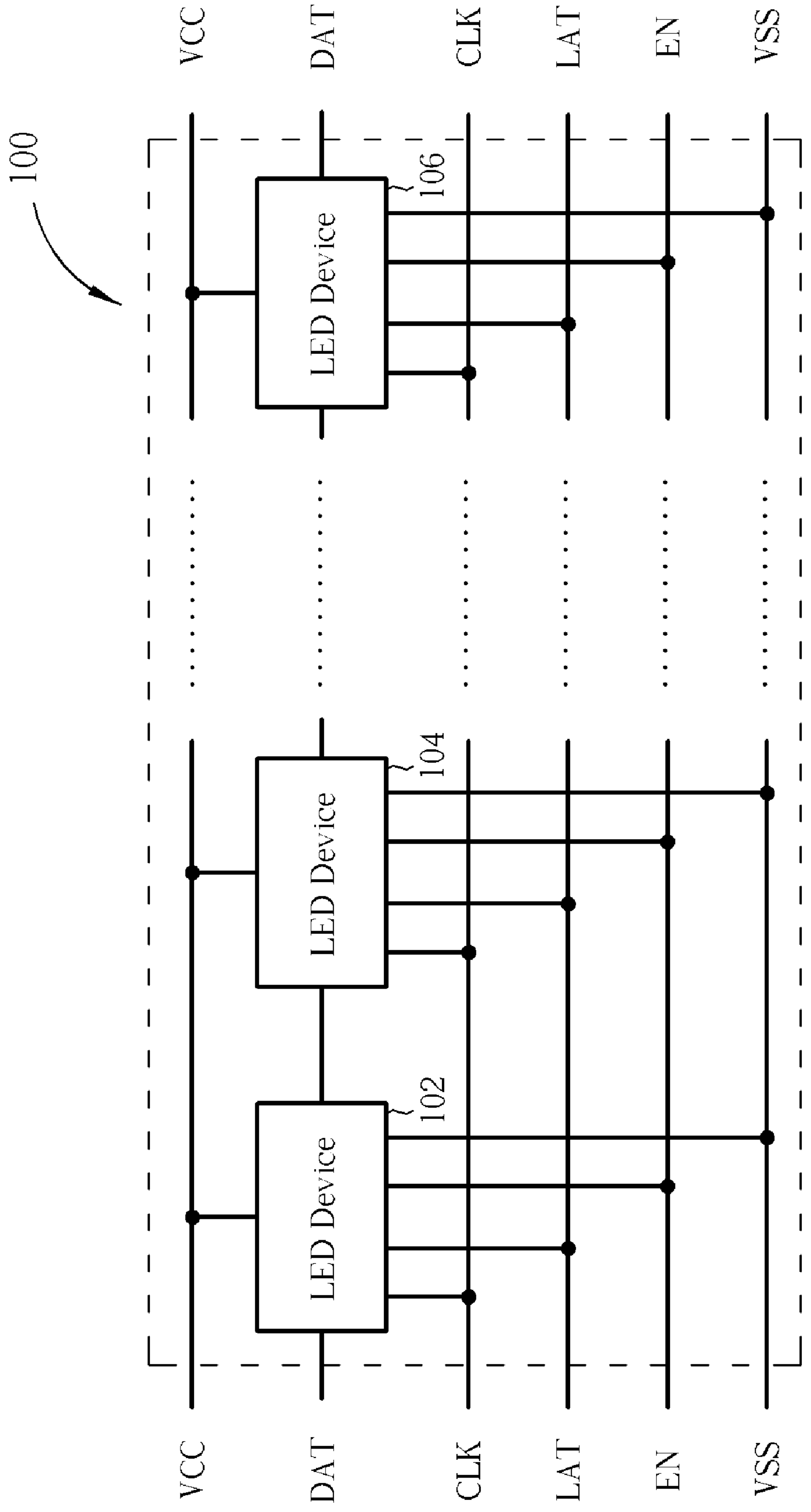
Fig. 1 Prior Art
FIG. 1 is a diagram of a prior art LED system.
Figure 2:
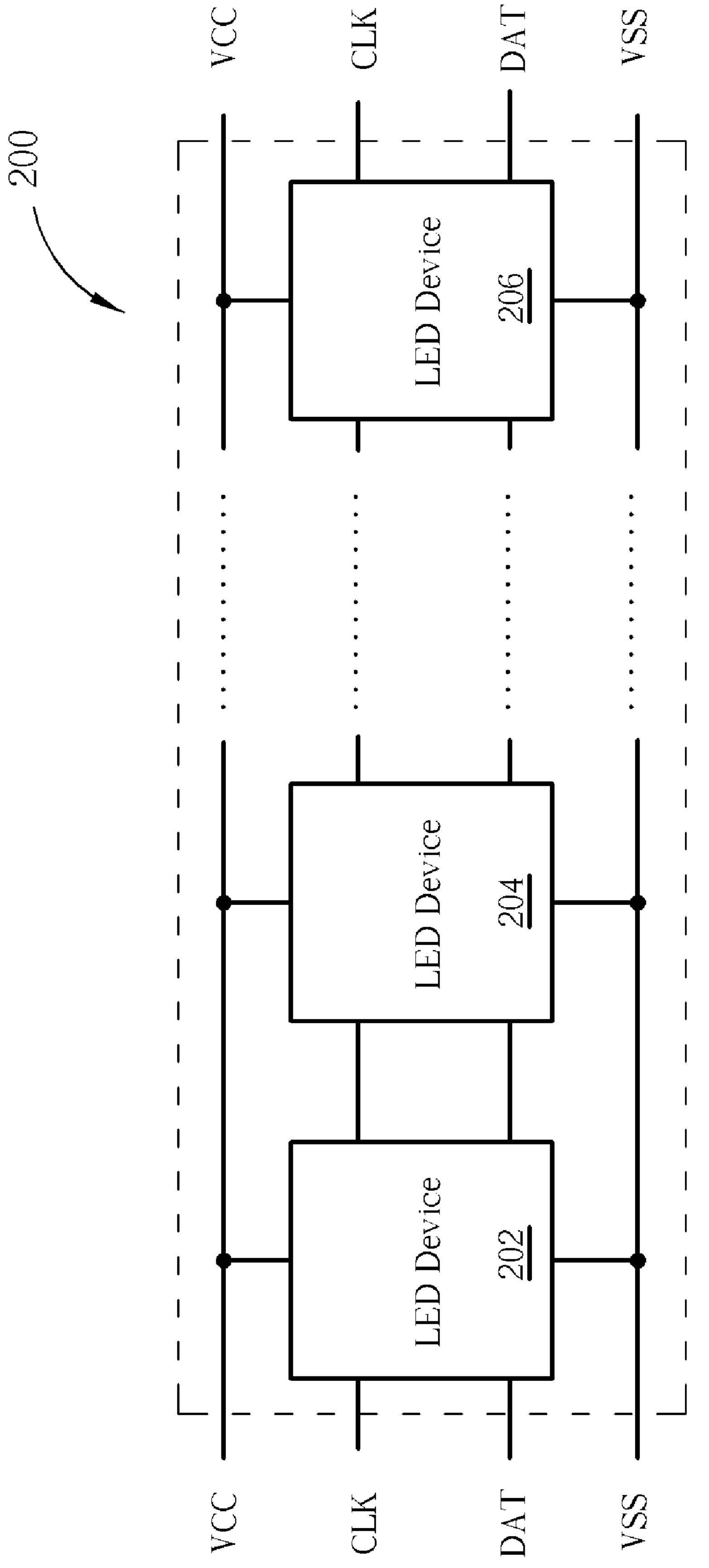
Fig. 2 Prior Art
FIG. 2 is a diagram of another prior art LED system using PWM technology.
Figure 3:
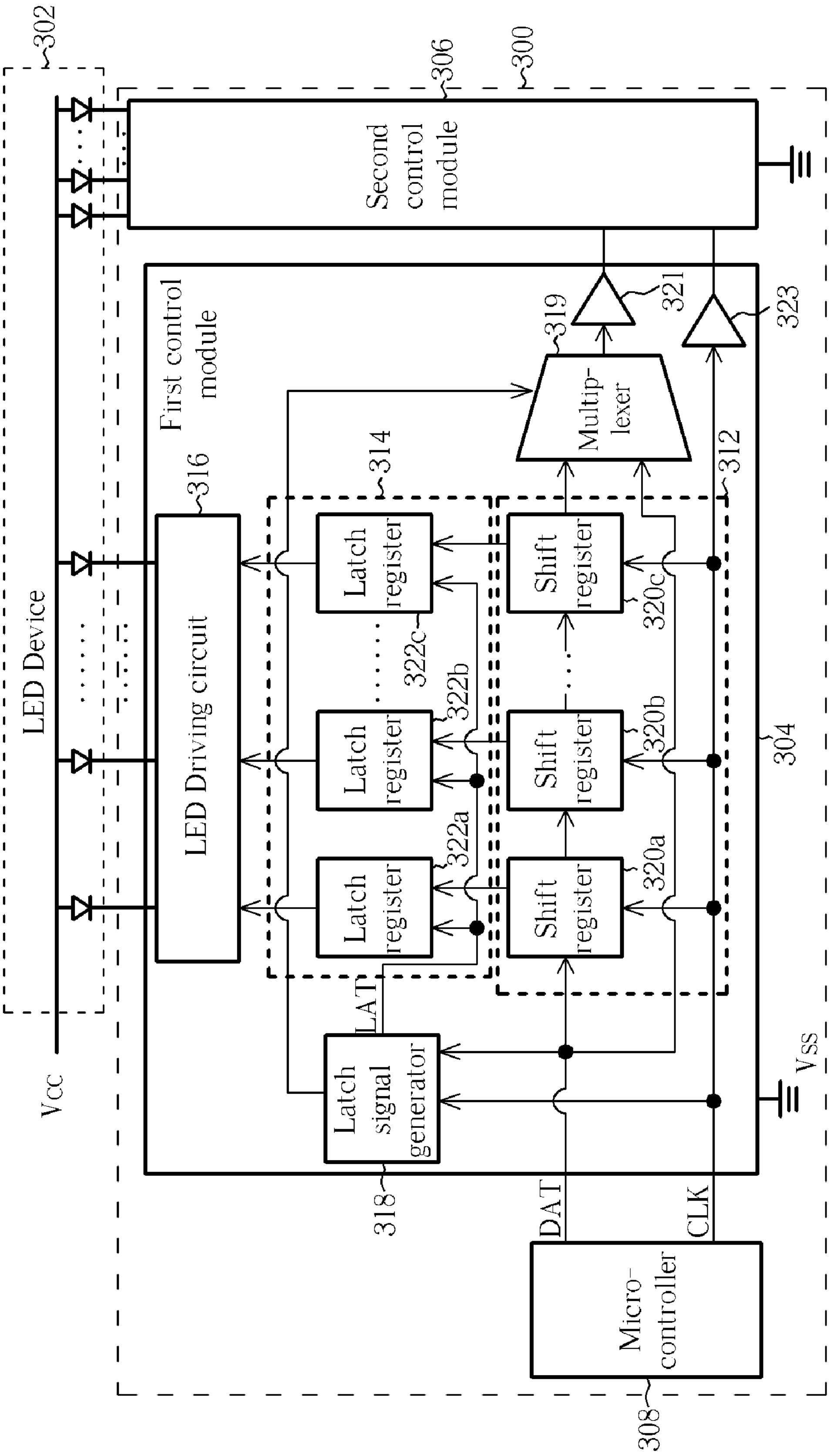
FIG. 3 is a diagram of an embodiment of a control circuit applied in an LED device according to the present invention.

Please refer to FIG. 3. FIG. 3 is a diagram of an embodiment of a control circuit 300 applied in an LED device 302 according to the present invention. As shown in FIG. 3, the control circuit 300, comprising a plurality of control modules and a micro-controller 308, is utilized for controlling the LED device 302. Please note that, although only a first control module 304 and a second control module 306 are shown in FIG. 3, this is not a limitation of the present invention. In this embodiment, the first and second control modules 304, 306 are coupled together to form a series connection structure; however, in other embodiments of the present invention, a plurality of first control modules 304 can be coupled together to form another series connection structure before coupling to the second control module 306. This circuit configuration also belongs to the scope of the present invention. The micro-controller 308 is utilized for generating an input data signal DAT and filling a specific data pattern into the input data signal DAT after a driving data in the input data signal DAT. Additionally, the micro-controller 308 further generates a clock signal CLK and controls the clock signal CLK to remain at a specific logic level during a predetermined time. In this embodiment, the first control module 304 comprises a shift register unit 312, a latch register unit 314, an LED driving circuit 316, a latch signal generator 318, a multiplexer 319, a first output buffer 321, and a second output buffer 322. The shift register unit 312, comprising a plurality of shift registers 320*a*, 320*b*, and 320*c*, is triggered by the clock signal CLK for buffering data transmitted in the input data signal DAT. For example, the shift register 320*a* will output data registered within itself to the shift register 320*b* and receive data from its input end for registering the received data in itself when being triggered by the clock signal CLK. Since the operation and function of the shift register is well known to those skilled in the art, it is not detailed for brevity. The latch register unit 314 comprises a plurality of latch registers 322*a*, 322*b*, and 322*c*, which are triggered by a latch signal LAT for latching data registered by corresponding shift registers 320*a*, 320*b*, and 320*c*, respectively. Please note that only three shift registers and three latch registers are shown in FIG. 3. This is not a limitation of the present invention, however. That is to say, the numbers of shift registers and latch registers adopted in each control module can be designed according to different requirements.

The LED driving circuit 316 is utilized for driving the LED device 302 according to the data latched within the latch registers 322*a*, 322*b*, and 322*c*. In this embodiment, the latch signal generator 318 is utilized for generating the latch signal LAT according to the input data signal DAT and the clock signal CLK. That is to say, the latch signal generator 318 generates the latch signal LAT by detecting that the clock signal CLK remains at a specific logic level during a specific time and the specific data pattern exists in the input data signal DAT simultaneously. In addition, the latch signal generator 318 also controls the multiplexer 319 to output data registered in the shift register unit 312 or the input data signal DAT selectively. The first output buffer 321 and the second output buffer 323 are utilized for separately buffering an output of the multiplexer 319 and the clock signal CLK to ensure a signal at the input end of a next control module coupled to the first control module 304 (for example, the second control module 306) does not degrade. Moreover, the first and second output buffers 312, 323 also provide a fixed delay time between the input data signal DAT and the clock signal CLK to avoid any phase shift between the input data signal DAT and the clock signal CLK so that the control circuit 300 can be always stabilized. Please note that, if the second control module 306 does not need to transmit signals to a next control module coupled to itself, the second control module 306 comprises all elements within the first control module 304 except the multiplexer 319, the first output buffer 321, and the second output buffer 323. The operation and names of elements in the second control module 306 are not detailed further for brevity.

Figure 4:
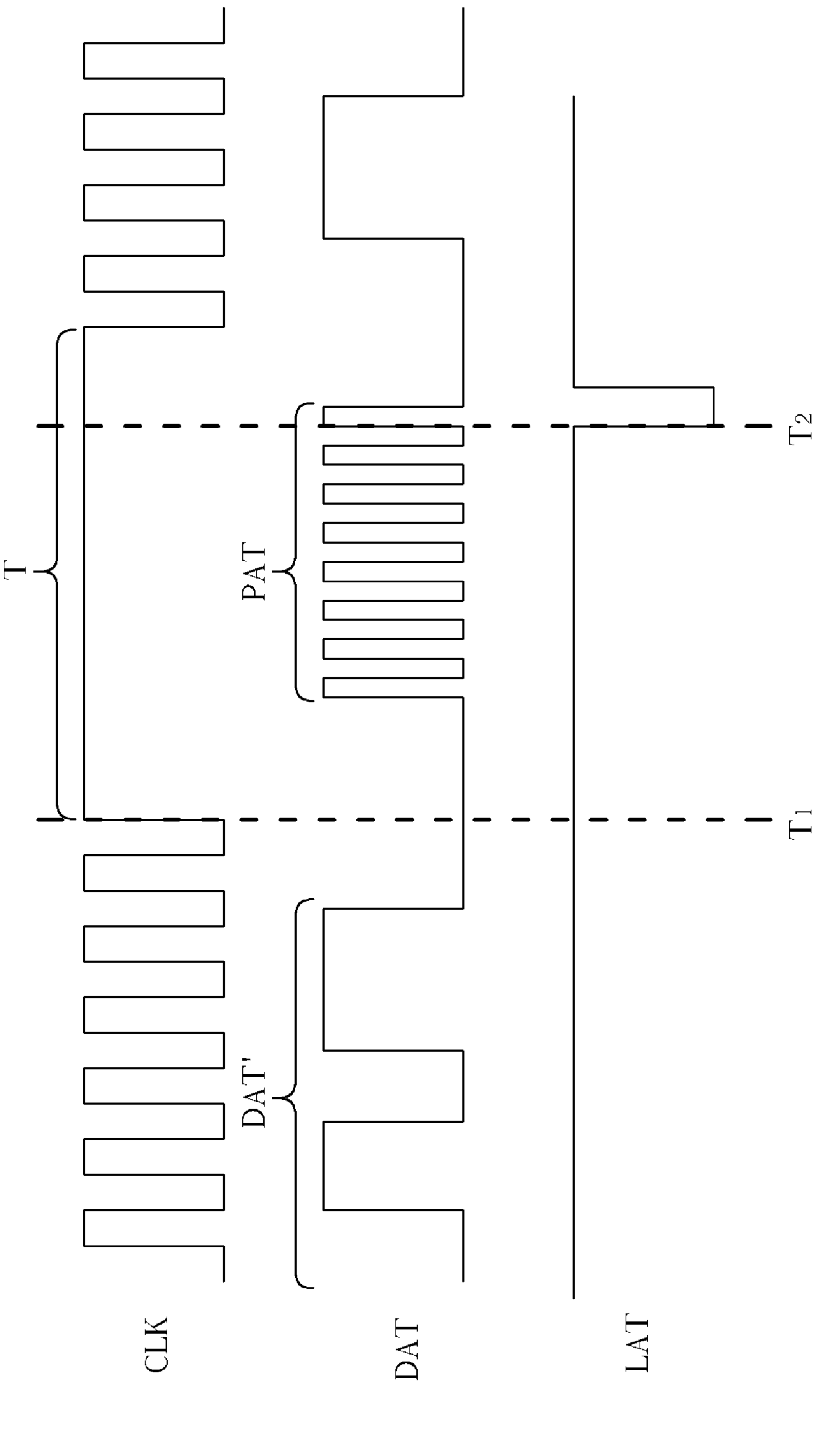
FIG. 4 is a timing diagram of the input data signal, clock signal, and the latch signal utilized by the control circuit shown in FIG. 3.

Please refer to FIG. 4. FIG. 4 is a timing diagram of the input data signal DAT, the clock signal CLK, and the latch signal LAT utilized by the control circuit 300 shown in FIG. 3. In this embodiment, it is assumed that shift registers are triggered by the rising edge of the clock signal CLK. In other embodiments, however, shift registers can be triggered by other means, for example they can be triggered by the falling edge of the clock signal CLK. This is not a limitation of the present invention. As shown in FIG. 4, before time $T_1$, the micro-controller 308 continues generating the input data signal DAT having a driving data DAT' and outputting a normal clock signal CLK, and the multiplexer 319 outputs data registered in the shift register unit 312. The shift registers in the first and second control modules 304, 306 will be triggered by the rising edge of the clock signal CLK, and the driving data in the input data signal DAT will be transmitted to the shift registers in the first control module 304 and the second control module 306 until the driving data is registered in these shift registers exactly. Therefore, before time $T_1$, the latch signal LAT continues to remain at a stable voltage level (e.g. a high voltage level shown in FIG. 4), preventing erroneous triggering of any latch register, so driving the LED driving circuit 316 to control the LED device 320 before the driving data has arrived at the corresponding shift registers does not occur. In other embodiments of the present invention, according to different schemes for triggering the latch registers, the latch signal LAT can be controlled to be remain at a stable low voltage level, preventing latching of data registered in the shift registers by the latch registers. Any specific voltage level applied in the latch signal LAT for preventing triggering of the latch registers also obeys the spirit of the present invention.

When the driving data has arrived at the corresponding shift registers (e.g. the transmission of the driving data is just finished at time $T_1$), the micro-controller 308 controls the clock signal CLK to remain at a specific logic level (e.g. a logic level "1"; however, a logic level "0" is also suitable in other embodiments) during a predetermined time T shown in FIG. 4. At this time, by receiving the clock signal CLK at the logic level "1", the latch signal generator 318 controls the multiplexer 319 to stop outputting data registered in the shift register unit 312 and outputs the input data signal DAT directly to the second control module 306 instead.

For the time being, a specific data pattern PAT exists in the input data signal DAT. In this embodiment, the specific data pattern PAT is a pulse signal having eight rising edges. For an example of the latch signal generator 318, when the latch signal generator 318 receives the clock signal CLK at the specific logic level and the specific data pattern PAT, i.e. when the latch signal generator 318 detects the pulse signal having eight rising edges (at time $T_2$) on condition that the clock signal CLK remains at logic level "1", the latch signal generator 318 will generate the latch signal LAT having a low-level pulse to all latch registers. After receiving the latch signal LAT having low-level pulse, the latch registers latch data registered in the corresponding shift registers and drive the LED driving circuit 316 to control the operation of the LED device 302. After the predetermined time T is reached, the clock signal CLK will become normal and another driving data in the input data signal DAT will be transmitted to all shift registers for controlling the LED device 302. According to the above-mentioned description, if the frequency of the specific data pattern PAT is higher, an interval between timings for generating the latch signal LAT and time $T_1$ becomes shorter. Therefore, the problem of a long transmission waiting time is solved. Additionally, the timing of generating the latch signal LAT can be designed according to the situation of the system loading in any time since the clock signal CLK and the input data signal DAT are controlled by the micro-controller 308. For this reason, the operating frequency of the clock signal CLK is not limited by a minimum input frequency compared to the prior art. Consequently, the control circuit 300 has better elasticity and reliability than conventional systems. Finally, the control circuit 300 only needs four electronic lines for providing the power supply voltage level $V_{cc}$ and ground voltage level $V_{ss}$, and for transmitting the input data signal DAT and the clock signal CLK to control the LED device 302. Please note that the shift register unit 312, latch register unit 314, LED driving circuit 316, and the latch signal generator 318 can be integrated within a single chip for achieving the goal of circuit integration.

Please note that any scheme for controlling the LED device 302 according to the input data signal DAT and the clock signal CLK obeys the spirit of the present invention. Detecting the specific data pattern PAT is not limited to only detecting the rising edges of the specific data pattern PAT. For example, detecting falling edges of the specific data pattern PAT is also suitable. In addition, detecting the rising edges of the specific data pattern PAT is not limited to only detecting eight rising edges of the specific data pattern PAT; any method of detecting the specific data pattern PAT (e.g. counting signal level transitions or measuring the frequency of the specific data pattern) is suitable for the present invention. Therefore, the waveform of the specific data pattern PAT can be designed according to different requirements, i.e. any designed signal can be used as the specific data pattern PAT, providing it can be detected by the latch signal generator 318. Any modification of the specific data pattern PAT also belongs to the scope of the present invention. Moreover, in this embodiment, the latch registers latch data registered in the corresponding shift registers when receiving the latch signal LAT having the low-level pulse. However, the latch registers can also latch data registered in the corresponding shift registers when receiving a rising edge of the latch signal LAT or a falling edge of the latch signal LAT. This also obeys the spirit of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control circuit for controlling a Light Emitting Diode (LED) device according to an input data signal and a clock signal, comprising:

at least a first control module, comprising:

a shift register unit, coupled to the input data signal and the clock signal, the shift register unit comprising at least a shift register triggered by the clock signal to buffer data transmitted in the input data signal;

a latch register unit, coupled to the shift register unit, the latch register unit comprising at least a latch register triggered by a latch signal to latch data buffered by the shift register;

an LED driving circuit, coupled to the latch register unit, for driving the LED device according to data latched by the latch register; and a latch signal generator, coupled to the input data signal and the clock signal, for generating the latch signal according to the input data signal and the clock signal.

2. The control circuit of claim 1, further comprising:

a micro-controller, coupled to the first control module, for generating the input data signal and the clock signal, where the micro-controller stuffs the input data signal with a specific data pattern and controls the clock signal to remain at a specific logic level during a predetermined time;

wherein the latch signal generator generates the latch signal when detecting that the clock signal remains at the specific logic level and the specific data pattern exists in the input data signal.

3. The control circuit of claim 2, wherein the latch signal generator counts at least a specific number of signal edges corresponding to at least one edge type in the input data signal to detect the specific data pattern when the clock signal remains at the specific logic level during the predetermined time, and the latch signal generator generates the latch signal when the number of signal edges reaches a predetermined value.

4. The control circuit of claim 2, wherein the micro-controller fills the specific data pattern into the input data signal after a driving data and controls the clock signal to remain at the specific logic level after the driving data is transmitted completely.

5. The control circuit of claim 2, being coupled to a second control module serially connected to the first control module, wherein the first control module further comprises:

a multiplexer, coupled to the shift register unit and the input data signal, for selectively outputting data buffered in the shift register unit or the input data signal to be an input data signal of the second control module.

6. The control circuit of claim 5, wherein the multiplexer chooses to transmit the input data signal into the second control module directly after the clock signal remains at the specific logic level, and the multiplexer chooses to transmit data buffered in the shift register unit into the second control module after the latch signal generator generates the latch signal.

7. The control circuit of claim 6, wherein the latch signal generator outputs a selection control signal to the multiplexer during the predetermined time that the clock signal remains at the specific logic level for controlling the multiplexer to transmit the input data signal into the second control module directly.

8. The control circuit of claim 5, wherein the first control module further comprises:

a first output buffer, coupled to the multiplexer, for buffering an output of the multiplexer transmitted to the second control module; and a second output buffer, coupled to the clock signal, for buffering the clock signal transmitted to the second control module.

9. The control circuit of claim 1, wherein the shift register unit, the latch register unit, the LED driving circuit, and the latch signal generator are integrated in an integrated circuit.

10. The control circuit of claim 1, utilizing only four electronic lines for providing a power supply voltage, a ground voltage, the input data signal, and the clock signal to control the LED device.

* * * * *